Sept. 21, 1954      A. D. MAY      2,689,739
JIG CHUCK
Filed March 15, 1952      2 Sheets-Sheet 1
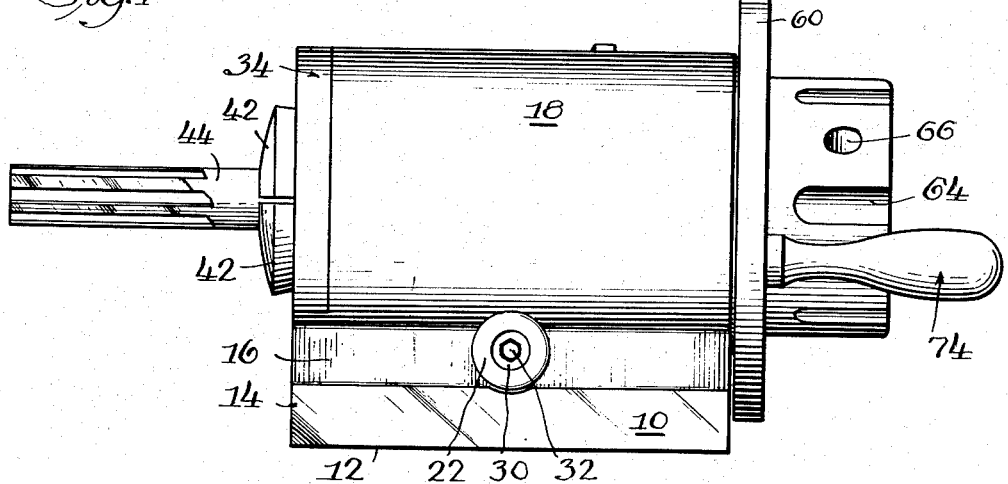
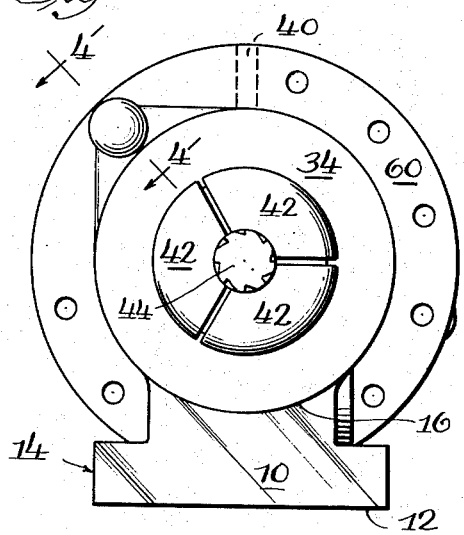
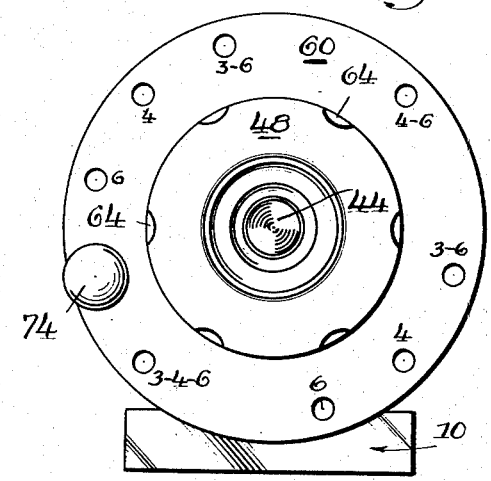
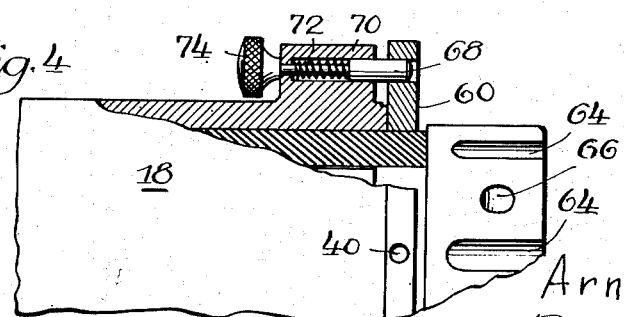
Inventor,
Arnold D May
By T. B. Slisz Atty Sept. 21, 1954     A. D. MAY     2,689,739
JIG CHUCK
Filed March 15, 1952     2 Sheets-Sheet 2
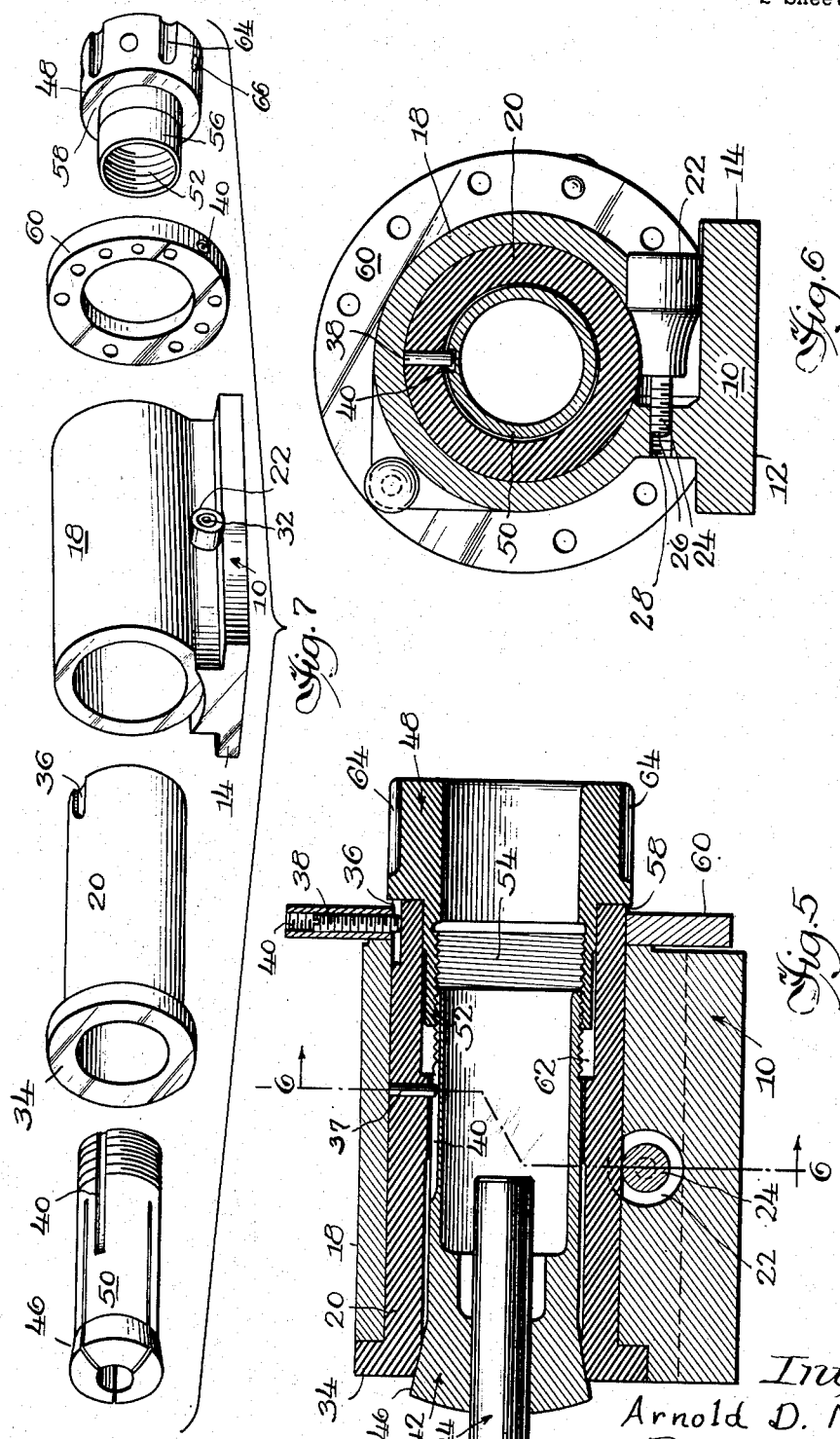
Inventor,
Arnold D. May Patented Sept. 21, 1954

2,689,739

UNITED STATES PATENT OFFICE 2,689,739

JIG CHUCK

Arnold D. May, Chicago, Ill.

Application March 15, 1952, Serial No. 276,833

1 Claim. (Cl. 279—5)

This invention pertains to the metal working arts and more particularly to that specific division of these arts directed to holders and dividing engines. More specifically it is directed to a portable type of a holder capable of transfer from one metal working machine to another without disturbing the setting of the work piece.

In the metal working arts, a number of various operations, such as milling, slotting, turning, boring, planing etc. must be made sometimes on one piece of work without disturbing its setting. Since there is no one universal machine, it is self evident that the work piece must be placed into each machine, carefully set and adjusted, machined to the full capabilities of the machine and then removed to be transferred to another metal working machine and undergo a similar series of steps. In each case, whenever it is repeated on the various types of metal working machines, the work piece must always be set with particular reference to its dimensions and in a reference setting to each machine. The setting of a work piece in reference to the machine is a delicate operation but far more delicate is the setting of the work piece itself to the work to be done on it so that all operations are in agreement and accurately performed.

Ordinarily when a skilled metal working craftsman is operating on a piece of metal, he will fix some point on the piece as a reference point from which all other operations thereon are staked. After some work is done on the piece with a certain machine, say for instance a lathe, he will then remove it from the chuck and move it to another machine, for instance a grinder and set it up there for further work. In setting up this operation, he will bear in mind the initial reference point on the work piece so that all work done is accurately related and that the final piece will be correctly formed and dimensionally accurate.

There are a number of devices, gauges, etc. used to set up work, but practically all are based on the property of aligning the work piece within a machine itself, but not in aligning the work in relation to itself. Likewise a piece of work that is machined may frequently be slotted or segmented into gear blanks, twist drills or the like and frequently is set up for such work by means of a dividing engine or gauge of similar type. All of these devices are expensive and normally cannot be used to hold the work piece at the time work is being done on the piece.

It therefore is an object of my invention to provide a chuck that can be easily transported from point to point on various machines.

Another object of my invention is to provide a jig chuck that will permit facile movement of the work piece within the device and yet be easily movable from machine to machine.

A still further object of my invention is to provide a combination dividing engine or gauge, jig and chuck for the purposes set forth hereinabove.

A still further and additional object of my invention is to provide a quick, facile and easy way and device for accomplishing the same to be used in setting jobs on various types of machines with particular reference point on the work piece itself.

These and other objects, adaptations, variations, modifications and extensions will become clear and obvious in view of the clear and lucid description given hereinbelow of the fundamental concepts underlying the principles of my invention and whose preferred embodiments for purely exemplary purposes only are illustrated in the attached drawings forming a part of this disclosure.

In the drawing, Figure 1 is a vertical view of the jig chuck.

Figure 2 is a left end view showing a work piece in position.

Figure 3 is a right end view showing the dividing gauge and chuck release head.

Figure 4 is a partial section taken along line 4—4 of Figure 2.

Figure 5 is a vertical section through the device illustrated in Figure 1.

Figure 6 is a section taken along line 6—6 of Figure 5 and

Figure 7 is an exploded view showing the relationship of the various components of my improved jig chuck dividing engine.

In the drawings, the numerals are used to point out the various elements and are used in identically the same capacity hereinbelow as reference indicia.

My improved device comprises a base 10 having a flat undersurface 12 and vertical walls 14 extending at right angles to the said undersurface 12. The upper surface 16 is a curvilinear cradle like structure upon which is nested an external cylinder 18. The cylinder 18 may be welded, brazed or otherwise fixedly attached to the said cradle surface 16, or if desired it can be made as an integral part of the cradle base and cast as one piece which can be machined and polished to the desired degree.

Within the cylinder 18 there is an inner tube 20 which fits snugly into the said cylinder and is firmly fixed in place by means of bushing clamp 22 affixed to the end of the machine screw 24 which has threads 26 thereon and which threads 26 engage female threads 28 tapped into the cradle block 16. The screw 24 has in its head 30 an Allen type screw head recess 32 in which an Allen type wrench may be inserted to tighten or loosen the machine screw 24 and the bushing clamp 22 against the outer surface of the inner tube 20 and retain the latter firmly in position.

One end of the inner tube 20 has an integral collar 34 thereon whose side abuts against the edge of the outer cylinder 18. This collar 34 may be preferably an integral part of the inner tube 20 or formed from an annular plate affixed by conventional methods to the said tube 20. On the other end of said inner tube 20 is a surface recess 36 into which fits a lock screw 38 threadedly engaged by a tapped hole 41 in an indexing plate 60. The head of said lock screw 38 may have an Allen type wrench receiving slot so that it can be driven snug into the said recess 36 and lock firmly in position the indexing plate 60.

At about the midsection of said inner tube 20, there is placed a pin 37 fitted tightly through a hole in the inner tube 20 and extending into the interior of said tube for a sufficient distance to engage the slot 40 in surface of the collet 50.

The collet 50 is a conventional and well known work holding tool. On one end thereof are spring jaws 42 which self center the work piece 44 by means of the conical wedge 46 abutting against the inside edge of the inner tube 20. The conical wedge 46 is drawn up tightly by means of a hand screw wheel 48 with a tubular extension 56 having therein female threads 52 which engage male threads 54 formed on the end of said collet 50. The hand screw wheel 48 has a shoulder thereon 58 which abuts against the edge of the inner tube 20 and thus exerts pressure on the conical wedges 46 forming an integral part of the jaws 42 which act on the other end of the collet 50 on which the collar 34 is located.

Within one end of the interior surface of said inner tube 20 is an annular internal recess 62 within which fits the tubular extension 56 of the hand screw wheel 48. The hand screw wheel has the usual provision of recesses 64 for a positive grip for the fingers of the operator and also holes 66 for use of a bar to tighten the wheel and secure the work piece 44 within the jaws 42 of the collet 50. The hand screw wheel may also be knurled to provide an additional better grip.

The indexing plate 60 is press fitted on the end of the inner tube 20 and also further secured thereon by means of the screw 38 recessed in the hole 41 tapped in one edge of said plate 60. As mentioned previously this screw is secured firmly by means of a screw driver. Since this indexing plate 60 is secured to the inner tube 20, it is obvious that the inner tube 20 can be rotated within the cylinder 18 when the bushing clamp 22 is loose. Upon tightening of the said clamp 22, the inner tube 20 and the collet 50 can be locked in any position set on the indexing plate 60.

The indexing plate 60 is divided into a number of divisions so that the work piece 44 can be turned ½, ⅓, ¼, ⅕, ⅙, etc. around as desired and is set by the indexing plate 60. Accordingly there are provided within the outer portion of the said indexing plate 60 a series of properly spaced indexing apertures such as 3, 4, 6 illustrated in the drawings annexed hereto.

To set the indexing plate 60, a catch 68 is provided within an extension lug 70 forming an integral part of the outer cylinder 18 and placed in juxtaposition with the said plate 60. A helical spring 72 about the catch 68 housed within the cavity formed in the lug 70 is also provided to keep the piece extending. A knurled nut 74 on end of said catch rod or pin facilitates removal of catch placed in any of the holes 3, 4, 6, etc. within the indexing plate 60. A handle 74 is placed on the indexing plate 60 to facilitate turning around the plate to the desired position.

In using this improved jig chuck the work piece such as 44 is placed within the collet jaws 42, the collet 50 inserted within the inner tube 20 so that the pin 37 fits within the slotted recess 40, the hand screw wheel 48 threadedly engaged to the tube portion of said collet 50 and drawn up tight so that the piece is held securely within the jaws 42 and within the inner tube 20. The tube is then rotated to the desired position by means of the handle 74 on the indexing plate 60 so that the desired aperture like 3 is in linear juxtaposition with the catch 68 held within the lug 70. The catch 68 enters the opening 3 in the plate 60 and locks the tube 20, collet 50 and work piece 44 in position. To fasten this more rigidly, the bushing clamp 22 is then firmly screwed into contact with the outer surface of the inner tube 20. The work piece 44 is now ready for machining.

One of the features of my invention is the base 10 has a flat undersurface 12 and perpendicular thereto sidewalls 14. My device is portable and therefore once the work piece is locked in position within the jig chuck, it can be moved to any machine and set upon the flat bed surface of the machine. Here the piece can be turned to any direction or by removing the catch 68, the work can be rotated and placed in the most advantageous position for machining. After it is machined on one type of machine, it can be readily transported to another without disturbing the setting of the work piece within the jig chuck since the entire device is easily transported and moved. Likewise, since most beds of machines are flat, the flat surface 12 of the base 10 is always in relation to the bed of the machine upon which the jig chuck is placed.

In addition my improved device can be accurately positioned within a plain vise, or within any universal type thereof, or angle plates and still retain the work piece in proper relationship for machining. Likewise, the work piece is in a fixed relation to the chuck, it therefore is in the same relation to any flat parallel bed on any machine in which my improved jig chuck is used.

It is obvious that the above preferred modification is but an illustration and that a person skilled in this art can vary it widely and still come within the fundamental concepts of my invention as defined in the hereunto annexed claim.

I claim:

A jig chuck for holding work pieces in a fixed relationship comprising a flat bed, said bed having upright walls perpendicular to said flat bed, a tubular cylinder mounted above said flat bed and said walls, an inner tube rotatable within said cylinder and in parallel juxtaposition with said flat bed, the said inner tube having on end thereof an annular collar, the said collar abutting the end of said tubular cylinder, a curvilinear recess within the upper part of said flat bed to receive therein the curvilinear surface in complementary relationship of said annular collar, a means to lock said inner rotatable tube, a collet within said inner tube, an indexing means mounted on said inner tube and a means to set said indexing means with said tubular cylinder in a fixed relationship, the said setting means comprising an oblique opening in the base of said tubular cylinder, threads in said oblique opening, a screw bolt engageable by said threads, a bushing means on said screw bolt, curved walls on said bushing, means for contacting curvilinearly the outer surface of said inner tube and a means to turn said screw bolt in contact with surface of said inner tube.

References Cited in the file of this patent

UNITED STATES PATENTS

| Number | Name | Date |
|---|---|---|
| 2,429,617 | Gustafson | Oct. 28, 1947 |
| 2,434,600 | Swenson | Jan. 13, 1948 |

OTHER REFERENCES

American Machinist Publication, page 119, March 1, 1945.